(12) United States Patent
Beaulieu

(10) Patent No.: US 8,442,093 B2
(45) Date of Patent: May 14, 2013

(54) SYSTEM AND METHOD FOR RECEIVING TIME-HOPPING ULTRA-WIDE BANDWIDTHS SIGNALS

(75) Inventor: Norman C. Beaulieu, Edmonton (CA)

(73) Assignee: The Governors of the University of Alberta, Edmonton, Alberta (CA)

( * ) Notice: Subject to any disclaimer, the term of this patent is extended or adjusted under 35 U.S.C. 154(b) by 956 days.

(21) Appl. No.: 12/438,262

(22) PCT Filed: Aug. 23, 2007

(86) PCT No.: PCT/CA2007/001485
§ 371 (c)(1),
(2), (4) Date: Feb. 20, 2009

(87) PCT Pub. No.: WO2008/022460
PCT Pub. Date: Feb. 28, 2008

(65) Prior Publication Data
US 2010/0008401 A1    Jan. 14, 2010

Related U.S. Application Data

(60) Provisional application No. 60/823,321, filed on Aug. 23, 2006.

(51) Int. Cl.
*H04B 1/00*  (2006.01)
(52) U.S. Cl.
USPC ........... 375/138; 375/238; 375/239; 375/354; 370/212; 370/213; 332/109; 332/112
(58) Field of Classification Search .................. 375/138, 375/238, 239, 354; 370/212, 213; 332/109, 332/112
See application file for complete search history.

(56) References Cited

U.S. PATENT DOCUMENTS

| | | | |
|---|---|---|---|
| 6,717,992 | B2 | 4/2004 | Cowie et al. |
| 7,164,720 | B2 | 1/2007 | Molisch et al. |
| 7,187,647 | B1 | 3/2007 | Gerakoulis et al. |
| 2004/0240597 | A1* | 12/2004 | Cattaneo et al. ............ 375/354 |
| 2006/0146964 | A1 | 7/2006 | Park et al. |

OTHER PUBLICATIONS

Moe Z. Win, and Robert A. Scholtz, Fellow, IEEE Transactions on Communications, vol. 48, No. 4, pp. 679-691 Apr. 2000.*
Bo Hu and Norman C. Beaulieu IEEE Transactions on Communications, vol. 53, No. 6, pp. 1053-1062 Jun. 2005.*
"Pulse Shapes for Ultra-Wideband Communication Systems", IEEE Transactions on Wireless Communications, vol. 4, pp. 1789-1797, Jul. 2005.
"A Pulse Design Paradigm for Ultra-Wideband Communication Systems", IEEE Transactions on Wireless Communications, vol. 5, pp. 1274-1278, Jun. 2006.

(Continued)

*Primary Examiner* — Zewdu Kassa

(57) ABSTRACT

A novel receiver structure is proposed for detecting a time-hopping ultra-wide bandwidth signal in the presence of multiple access interference. The proposed structure achieves better bit error rate performance than the conventional matched receiver when operating in multiple access interference. When operating in a multiple access interference-plus-Gaussian-noise environment, the receiver structure outperforms the conventional matched filter receiver for moderate to large values of signal-to-noise ratio. A receiver structure with adaptive limiting threshold is further proposed to ensure the performance of the soft-limiting receiver always meets or surpasses the performance of the conventional UWB receiver for all values of signal-to-noise ratio.

16 Claims, 13 Drawing Sheets

OTHER PUBLICATIONS

M. Z. Win and R. A. Scholtz, "Ultra-wide bandwidth time-hopping spread-spectrum impulse radio for wireless multiple-access communications," *IEEE Trans. Commun.*, vol. 48, pp. 679-691, Apr. 200.

A. Taha and K. M. Chugg, "A theoretical study on the effects of interference on UWB multiple access impulse radio," in *Proc. Asilomar Conference on Signals, Systems and Computers*, Nov. 3-6, 2002, pp. 728-732.

V. S. Somayazulu, "Multiple access performance in UWB systems using time hopping vs. direct sequence spreading," in *Proc. WCNC'02*, Orlando, USA, Mar. 2002, pp. 522-525.

Durisi and G. Romano, "On the validity of Gaussian approximation to characterize the multiuser capacity of UWB TH-PPM," in *Proc. IEEE Conf. On Ultra Wideband Systems and Technologies*, Baltimore, USA, May 20-23, 2002, pp. 157-162.

G. Durisi and S. Benedetto, "Performance evaluation of TH-PPM UWB systems in the presence of multiuser interference," *IEEE Commun. Lett.*, vol. 7, pp. 224-226, May 2003.

B. Hu and N. C. Beaulieu, "Exact bit error rate of TH-PPM UWB systems in the presence of multiple access interference," *IEEE Commun. Lett.*, vol. 7, 572-574, Dec. 2003.

B. Hu and N. C. Beaulieu, "Accurate evaluation of multiple access performance in TH-PPM and TH-BPSK UWB systems," *IEEE Trans. Commun.*, vol. 52, pp. 1758-1766, Oct. 2004.

J. G. Proakis, Digital Communications. $5^{th}$ Ed. New York: McGraw-Hill, 2008, pp. 160-183.

J. S. Lehnert and M. B. Pursley, "Error probabilities for binary direct-sequence spread-spectrum communications with random signature sequences," *IEEE Trans. Commun.*, vol. 35, pp. 87-98, Jan. 1987.

M. Schwartz and L. Shaw, *Signal Processing: Discrete Spectral Analysis, Detection and Estimation*. New York: McGraw-Hill, 1975, pp. 220-233.

Cong Ling, et al. "Multisampling Decision-Feedback Linear Prediction Receivers for Differential Space-Time Modulation Over Rayleigh Fast-Fading Channels", IEEE Transactions on Communications, vol. 51, No. 7, Jul. 2003, pp. 1214-1223.

US Office Action dated Sep. 14, 2011 issued for U.S. Appl. No. 12/439,072.

\* cited by examiner

SYSTEM AND METHOD FOR RECEIVING TIME-HOPPING ULTRA-WIDE BANDWIDTHS SIGNALS

RELATED APPLICATIONS

This application is the National Phase of International Application No. PCT/CA2007/001485 filed on Aug. 23, 2007, which claims priority from U.S. Provisional application No. 60/823,321 filed on Aug. 23, 2006, which documents are both incorporated herein by reference in their entirety.

FIELD OF THE INVENTION

The invention relates to systems and methods for receiving time-hopping ultra-wide bandwidth signals.

BACKGROUND OF THE INVENTION

Ultra-wide bandwidth technology (UWB) is currently being investigated as a promising solution for high capacity wireless multiple access systems. A time-hopping sequence is applied in UWB systems to eliminate catastrophic collisions in multiple access deployments. Studies of multiple access system performance for time-hopping systems have been conducted in which a conventional single-user matched filter (correlation receiver) was used to detect a desired user signal. It has been shown that multiple access interference significantly degrades the bit error rate (BER). In some studies, the bit error rate (BER) was estimated by using a Gaussian approximation in which a central limit theorem (CLT) was employed to approximate the sum of multiple access interference (MAI) as an additive Gaussian noise (AGN) process. If a signal is corrupted by AGN, the matched filter is an optimum receiver in the sense that it maximizes an output signal-to-noise ratio (SNR). In the absence of intersymbol interference, it is also the minimum probability of error receiver. However, the MAI in time-hopping ultra-wide bandwidth technology (TH-UWB) systems is not Gaussian-distributed interference. The Gaussian approximation significantly underestimates the BER of practical TH-UWB systems for medium and large SNR values, where the power of the MAI is large. In other words, multiple access interference in TH-UWB systems cannot be reliably modeled as AGN. Therefore, the conventional single-user matched filter or correlation receiver is not necessarily an optimal single-user receiver for UWB. Furthermore, in applications, where it is desired to achieve maximum user capacity, the performance of the system will be limited by MAI and the Gaussian noise may be negligible.

Time-Hopping UWB System Models

In the detailed examples presented below, a time-hopping binary phase shift keying (TH-BPSK) UWB system is considered, but the analysis can also be used for time-hopping pulse position modulation (TH-PPM) systems. A typical TH-BPSK UWB signal has the form $$s^{(k)}(t)\sqrt{\frac{E_b}{N_s}}\sum_{j=-\infty}^{\infty} d^{(k)}_{\lfloor j/N_s \rfloor} p(t - jT_f - c^{(k)}_j T_c) \quad (1)$$

where t is time, $s^{(k)}(t)$ is the kth user's signal conveying the jth data bit, and p(t) is the signal pulse with pulse width $T_p$, normalized so that $\int_{-\infty}^{+\infty} p^2(t)=1$. The structure of this TH-BPSK model is described as follows:

$E_b$ is the bit energy common to all signals;

$N_s$ is the number of pulses required to transmit a single information bit, also known as a repetition code length;

$T_f$ is the time duration of a frame, and thus, the bit duration $T_b = N_s T_f$;

$T_c$ is the hop width satisfying $N_h T_c \leq T_f$;

$\{c_j^{(k)}\}$ represents the TH code for the kth source; it is pseudorandom with each element taking an integer value in the range $0 \leq c_j^{(k)} < N_h$, where $N_h$ is the number of hops;

$d_j^{(k)}$ represents the jth binary data bit transmitted by the kth source, taking values from $\{1,-1\}$ with equal probability.

Assuming $N_u$ users are transmitting asynchronously and the MAI dominates the ambient noise, the received signal is $$r(t) = \sum_{k=1}^{N_u} A_k s^{(k)}(t - \tau_k) \quad (2)$$

where $\{A_k\}_{k=1}^{N_u}$ represent the channel gains for all transmitted signals, and $\{\tau_k\}_{k=1}^{N_u}$ represent time shifts which account for user asynchronisms. Without loss of generality, it is assumed that $\tau_1=0$. Following a widely-adopted assumption on $\tau_k$, it is further assumed that $\{\tau_k\}_{k=2}^{N_u}$ are uniformly distributed on a bit duration $(0,T_b]$, in which $T_b$ defines the length of the bit duration.

Conventional Receiver Structures

A conventional single-user matched filter or correlation receiver can be used to coherently demodulate the desired user signal in an asynchronous system. For example, $s^{(1)}(t)$ is assumed to be the reference signal and $d_0^{(1)}(t)$ is assumed to be the transmitted symbol. Without loss of generality, $c_j^{(1)}=0$ is set for all j. Assuming perfect synchronization with the reference signal, the decision statistic of the conventional single-user correlation receiver is obtained as $$r = \sum_{m=0}^{N_s-1} \int_{mT_f}^{(m+1)T_f} r(t)p(t - \tau_1 - mT_f)dt = S + I \quad (3)$$

where $S = A_1 \sqrt{E_b N_s} d_0^{(1)}$ depends on one user of a set of $N_u$ users target signal bit $d_0^{(1)}$, and I is the total MAI from the $N_u - 1$ remaining active users in the time-hopping binary phase shift keying ultra-wide bandwidth technology (TH-BPSK UWB) system, given by $$I = \sqrt{\frac{E_b}{N_s}} \sum_{k=2}^{N_u} A_k I^{(k)} \quad (4)$$

where $$I^{(k)} = \sum_{m=0}^{N_s-1} \int_{mT_f}^{(m+1)T_f} s^{(k)}(t - \tau_k)p(t - \tau_1 - mT_f). \quad (5)$$

The difference of time shifts for user asynchronism is modeled as $$\tau_k - \tau_1 = m_k T_f + \alpha_k, \quad -T_f/2 \leq \alpha_k < T_f/2 \quad (6)$$

where $m_k$ is the value of the time difference $\tau_k - \tau_1$ rounded to the nearest frame time, and $\alpha_k$ is uniformly distributed on $[-T_f/2, T_f/2)$. Based on the assumption $$N_h T_c < \frac{T_f}{2} - 2T_p \quad (7)$$

Eq. (5) can be re-written in the form $$I^{(k)} = \sum_{m=0}^{N_s-1} \int_{-\infty}^{\infty} d^{(k)}_{\lfloor (m+m_k)/N_s \rfloor} p(x - \alpha_k - c_m^{(k)} T_c) p(x) dx \quad (8)$$

and the MAI, I, can be expressed as $$I = \sqrt{\frac{E_b}{N_s}} \sum_{k=2}^{N_u} A_k \sum_{m=0}^{N_s-1} d^{(k)}_{\lfloor (m+m_k)/N_s \rfloor} R(\alpha_k + c_m^{(k)} T_c). \quad (9)$$

Then, the desired data symbol can be detected based on the output of the conventional single-user correlation receiver.

It is seen from Eq. (9) that the decision statistic is obtained with a summation of integrals over the number of frames required to transmit one information bit, $N_s$. Each integration is a partial correlation for the corresponding frame. The decision statistic r can be rewritten as $$r = \sum_{m=0}^{N_s-1} r_m = \sum_{m=0}^{N_s-1} (S_m + I_m) \quad (10)$$

where $S_m$ is the desired signal component on the mth frame, given by $$S_m = A_1 \sqrt{\frac{E_b}{N_s}} d_0^{(1)},$$

and $I_m$ is the MAI on the mth frame, given by $$I_m = \sqrt{\frac{E_b}{N_s}} \sum_{k=2}^{N_u} A_k d^{(k)}_{\lfloor (m+m_k)/N_s \rfloor} R(\alpha_k + c_m^{(k)} T_c). \quad (11)$$

The output of the conventional correlation receiver, r, is the sum of the partial correlations on each frame.

SUMMARY OF THE INVENTION

According to one broad aspect, the invention provides a method of processing a received TH-UWB signal comprising: for each of $N_s$ time hopped representations of an information symbol in the TH-UWB signal where $N_s \geq 2$, generating a respective correlation output; performing a soft-limiting operation on each correlation output to produce a corresponding soft-limited correlation output; for each information symbol, generating a decision statistic using the soft-limited correlation outputs; making a decision on the information symbol based on the decision statistic and outputting the decision.

In some embodiments, the method further comprises receiving the TH-UWB signal on at least one antenna.

In some embodiments, performing a soft-limiting operation on each correlation output to produce a corresponding soft-limited correlation output comprises determining:

$$\tilde{r}_m = \begin{cases} |S_m|, & \text{if } |S_m| \leq r_m \\ r_m, & \text{if } -|S_m| < r_m < |S_m| \\ -|S_m|, & \text{if } r_m \leq -|S_m| \end{cases}$$

where $r_m$ is the correlation output for the mth representation and $S_m$ is the desired signal component for the mth representation, where $m = 1, \ldots, N_s$.

In some embodiments, the method further comprises: making an estimate of $S_m$ for each chip.

In some embodiments, The method further comprises: making an estimate of $S_m$ that is assumed to be constant for a duration of a transmission.

In some embodiments, for each information symbol, generating a decision statistic using the soft-limited correlation outputs comprises determining a decision statistic $\tilde{r}$ according to:

$$\tilde{r} = \sum_{m=0}^{N_s-1} \tilde{r}_m.$$

In some embodiments, making a decision on the information symbol based on the decision statistic and outputting the decision comprises determining a transmitted information bit $d_0^{(1)}$ according to:

$$\tilde{r} > 0 \Rightarrow d_0^{(1)} = 1$$

$$\tilde{r} \leq 0 \Rightarrow d_0^{(1)} = -1.$$

In some embodiments, the method further comprises: choosing a soft-limiting threshold according to channel conditions; wherein performing a soft-limiting operation on each correlation output to produce a corresponding soft-limited correlation output comprises performing the soft-limiting operation with the threshold chosen according to channel conditions.

In some embodiments, the threshold is chosen once at start up.

In some embodiments, further comprising choosing the threshold according to channel conditions from time to time.

In some embodiments, choosing a soft-limiting threshold according to channel conditions comprises choosing the soft-limiting threshold according to one or more of signal-to-interference ratio and signal-to-noise ratio.

In some embodiments, choosing the soft-limiting threshold according to channel conditions comprises: maintaining a threshold value for each of a plurality of channel conditions; determining a channel condition; selecting the threshold for the determined channel condition.

In some embodiments, maintaining a threshold value for each of a plurality of channel conditions comprises maintaining a threshold value for each of a plurality of SNR and/or SIR operating conditions.

In some embodiments, a receiver is adapted to implement the method as summarized above.

According to another broad aspect, the invention provides a receiver comprising: at least one antenna for receiving a received TH-UWB signal; a correlator for generating a correlation output for each of $N_s$ time hopped representations of an information symbol in the TH-UWB signal where $N_s \geq 2$;

a soft-limiter that performs a soft-limiting operation on each correlation output to produce a corresponding soft-limited correlation output; an accumulator that combines the soft-limited correlation outputs for each information symbol; an output decision generator that makes a decision on the information symbol based on the decision statisic and outputs the decision.

In some embodiments, the receiver further comprises: base band processing and timing controller that sets a threshold of the soft-limiter.

In some embodiments, the baseband processing and timing controller sets the threshold of the soft-limiter as a function of channel conditions.

According to yet another broad aspect, the invention provides a computer readable medium having stored thereon program instructions executable by a processor for processing a received time-hopping ultra-wide band (TH-UWB) signal comprising: program instructions for for each of $N_s$ time hopped representations of an information symbol in the TH-UWB signal where $N_s \geq 2$, generating a respective correlation output; program instructions for performing a soft-limiting operation on each correlation output to produce a corresponding soft-limited correlation output; program instructions for for each information symbol, generating a decision statistic using the soft-limited correlation outputs; program instructions for making a decision on the information symbol based on the decision statistic and outputting the decision.

In some embodiments, the computer readable medium further comprises program instructions for choosing a soft-limiting threshold according to channel conditions; wherein performing a soft-limiting operation on each correlation output to produce a corresponding soft-limited correlation output comprises performing the soft-limiting operation with the threshold chosen according to channel conditions.

DETAILED DESCRIPTION OF EMBODIMENTS OF THE INVENTION

A new UWB receiver structure and method are provided. Unlike the conventional correlation receiver which makes a bit recovery decision for a received information bit based on $r = \sum_{m=0}^{N_s-1} r_m$, the decision statistic variable $\tilde{r}$ is calculated as $$\tilde{r} = \sum_{m=0}^{N_s-1} \tilde{r}_m \qquad (12a)$$

where $$\tilde{r}_m = \begin{cases} |S_m|, & \text{if } |S_m| \leq r_m \\ r_m, & \text{if } -|S_m| < r_m < |S_m| \\ -|S_m|, & \text{if } r_m \leq -|S_m|. \end{cases} \qquad (12b)$$

$S_m$ is the signal amplitude without interference and without noise for the mth frame of the signal. In some situations, $S_m$ will not change and a static value S can be used for all $S_m$. The data transmission rate in a UWB system is usually large and, therefore, the channel is usually constant for the duration of a transmission. Also, $S_m$ may not change even if the noise level or the interference level changes. In some embodiments, $S_m$ is determined for each time hop, also referred to as a chip.

The transmitted information bit $d_0^{(1)}$ is then decided according to the rule $$\tilde{r} > 0 \Rightarrow d_0^{(1)} = 1$$

$$\tilde{r} \leq 0 \Rightarrow d_0^{(1)} = -1.$$

Figure 1A:
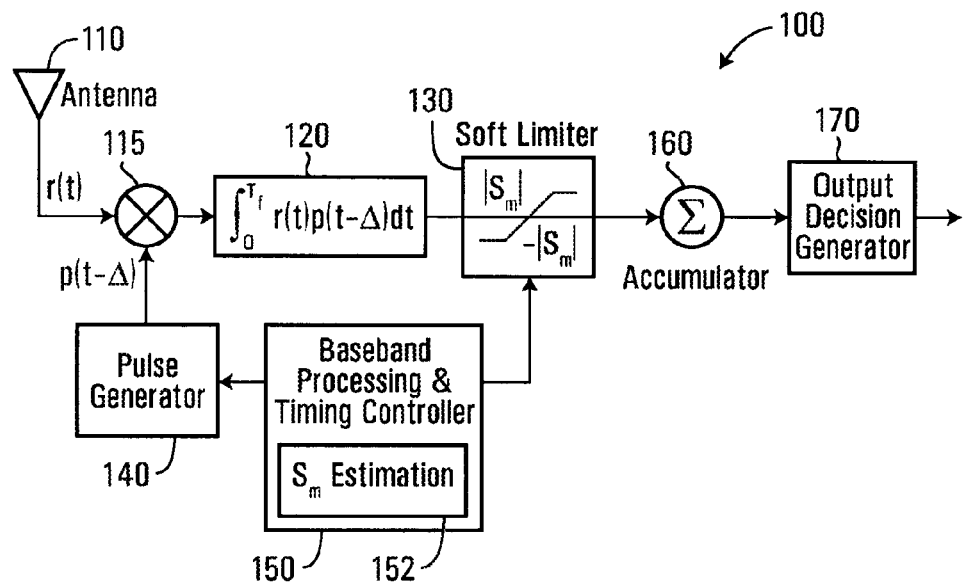
FIGS. 1A and 1B are block diagrams of examples of soft-limiting ultra-wide bandwidth (UWB) receivers provided by embodiments of the invention.

A block diagram of a receiver structure according to an embodiment of the invention is shown in FIG. 1A. The receiver structure, indicated at 100 has an antenna 110 for receiving a received signal r(t). The received signal is multiplied, at multiplier 115, by a pulse signal, p(t−Δ) generated by a pulse generator 140. The product is used for a correlation operation performed by correlator 120. An output of the correlator 120 is subject to soft-limiting by a soft-limiter 130. Outputs of the soft-limiter 130 are combined in accumulator 160 to produce a decision statistic. An output decision is made by an output decision generator 170 on the basis of the decision statistic.

While only a single antenna is shown in FIG. 1A, in other embodiments multiple receive antennas may be utilized in the receiver structure.

In some embodiments, the implementation of a receiver 100 based on Eq. (12) requires more information than the implementation of a receiver based on Eq. (3) since the former requires knowledge of $|S_m|$ whereas the latter does not. An interference burst in one frame has limited influence on bit recovery owing to the limiting inherent in each frame received by the receiver 100.

In some embodiments, baseband processing and timing controller 150 controls the pulse generator 140 and/or the timing of the soft-limiting operation 130.

In some embodiments, the receiver 100 estimates $S_m$ for use in the soft-limiter 130. This may for example be done using some form of signal-to-interference ratio (SIR) estimation. The illustrated example of FIG. 1A shows a $S_m$ estimation block 152 within the baseband processing and timing controller 150. In some embodiments the $S_m$ estimation block 152 may not be part of the baseband processing and timing controller 150, but may be, for example, a separate function of the receiver which provides an output to the soft-limiter 130.

BER performance of an example of the soft-limiting receiver structure will now be evaluated and compared to an example of a conventional correlation receiver (matched filter) for several different parameters, such as the number of interferers. Monte-Carlo simulation is used for predicting the BER. The simulation used for predicting the BER is limited to a UWB system using Gaussian sub-nanosecond pulses, or monocycles. An example of a mathematical model for monocycles of this type is found in M. Z. Win and R. A. Scholtz, "Ultra-wide bandwidth time-hopping spread-spectrum impulse radio for wireless multiple-access communications," *IEEE Trans. Commun.*, vol. 48, pp. 679-691, April 2000, which is hereby incorporated by reference in its entirety. The parameters for the example UWB system are listed in Table I. However, using other UWB pulses will give similar results as described in B. Hu and N. C. Beaulieu, "Pulse Shapes for Ultra-Wideband Communication Systems," *IEEE Transactions on Wireless Communications*, vol. 4, pp. 1789-1797, July 2005 and N. C. Beaulieu and B. Hu, "A Pulse Design Paradigm for Ultra-Wideband Communication Systems," *IEEE Transactions on Wireless Communications*, vol. 5, pp. 1274-1278, June 2006, which are both hereby incorporated by reference in their entirety.

TABLE I

Example TH-BPSK System Parameters

| Parameter | Notation | Typical Value |
|---|---|---|
| Time Normalization Factor | $T_p$ | 0.2877 ns |
| Frame Width | $T_f$ | 20 ns |
| Chip Width | $T_c$ | 0.9 ns |
| Number of Users | $N_u$ | 4 or 16 |
| Number of Chips per Frame | $N_h$ | 8 |
| Repetition Code Length | $N_s$ | 4 or 8 |

Figure 2:
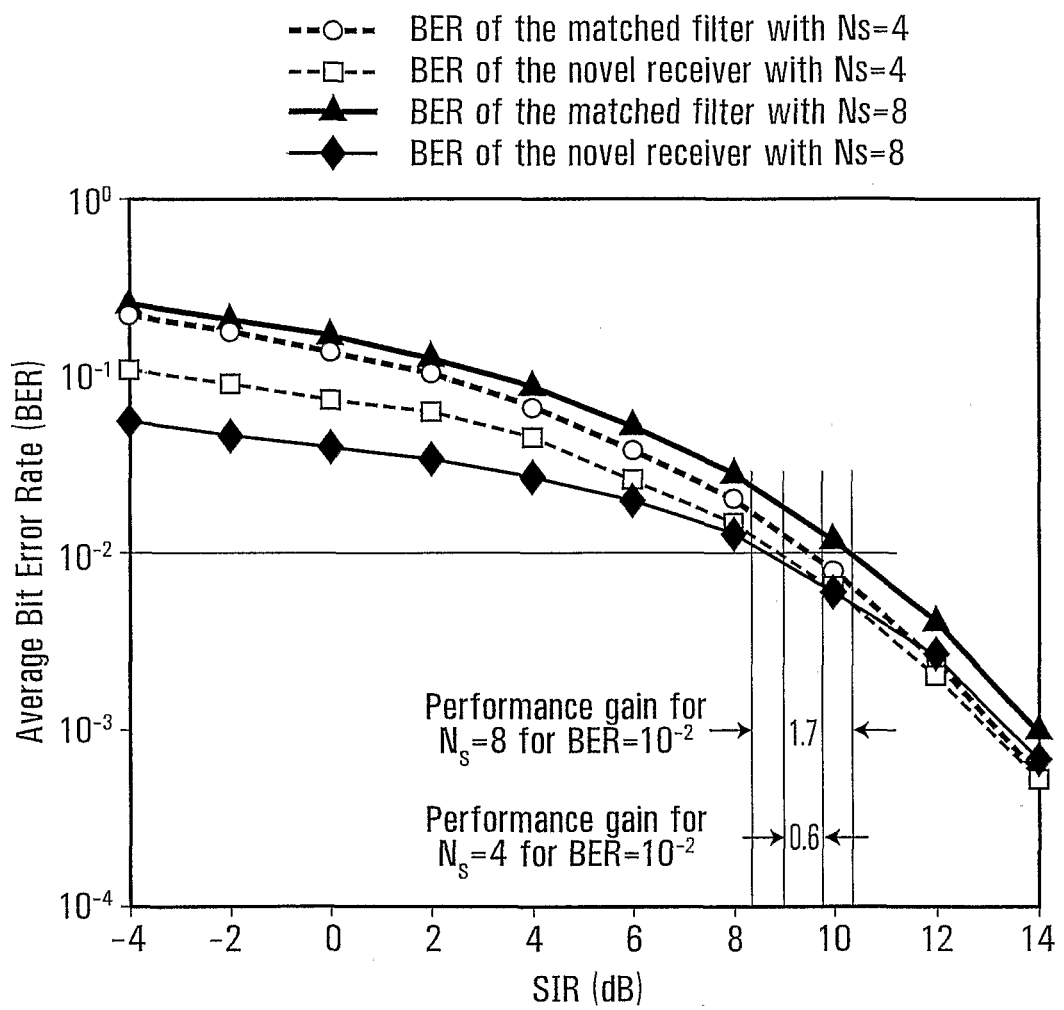
FIG. 2 is a graph containing plots of the average BER versus signal-to-interference ratio (SIR) of a soft-limiting UWB receiver according to an embodiment of the invention and a conventional TH-BPSK UWB receiver assuming 15 asynchronous interferers.

FIG. 2 illustrates BER curves of the TH-BPSK system in the presence of MAI, which are plotted as a function of SIR for different values of $N_s$ and $N_u$=16. The range of SIR on the horizontal axis is −4 dB to 14 dB and the range of BER on the vertical axis is $10^{-4}$ to $10^0$. The SIR is given by $$SIR = \frac{A_1^2 E_b N_s}{\text{var}[I]}. \quad (13)$$

The variance of the total interference in the TH-BPSK system can be defined as $$\text{var}[I] = E_b \sigma_a^2 \sum_{k=2}^{N_u} A_k^2 \quad (14)$$

where $\sigma_a^2$ is defined as $$\sigma_a^2 = \frac{1}{T_f} \int_{-\infty}^{\infty} \left[ \int_{-\infty}^{\infty} p(x-s)p(x)\,dx \right]^2 ds. \quad (15)$$

In the example of FIG. 2, it is observed that when transmission is interference-limited and the additive Guassian noise is small, the soft-limiting receiver outperforms the matched filter receiver for all SIR values in the range of the graph. For example, when the BER is $10^{-2}$, the performance gain achieved by using the soft-limiting receiver, which is the difference between the curves for a comparable $N_s$ for the BER of $10^{-2}$, for $N_s$=8 is approximately 1.7 dB, and the gain achieved for $N_s$=4 is approximately 0.6 dB, which are respectively indicated in FIG. 2.

It is noted from FIG. 2 that the performance gain achieved by using the soft-limiting receiver structure is strongly dependent on the value of SIR, and decreases as the value of SIR increases. For example, when the BER is $5\times10^{-2}$, the gains are 8.8 dB and 1.8 dB for $N_s$=8 and $N_s$=4, respectively, whereas the gains decrease to 0.6 dB and 0.15 dB, respectively, when the BER is $10^{-3}$.

The reduction of gain as SIR increases can be explained as follows. Both the soft-limiting and matched filter receivers add $r_m$ to the receiver decision statistic if $-|S_m|<r_m<|S_m|$. The two receivers differ when $|r_m|>|S_m|$; the matched filter receiver adds $r_m$ to the receiver decision statistic whereas the soft-limiting receiver adds $\text{signum}(r_m)|S_m|$, for example as can be seen in Eq. (12b) above. If $|S_m|$ is fixed and the variance of the interference is reduced, then as the variance decreases, $r_m \to |S_m|^+$ if $r_m>|S_m|$ and $r_m \to -|S_m|^-$ if $r_m<-|S_m|$. Thus, the matched filter receiver decision statistic approaches the decision statistic of the soft-limiting receiver, and the BER performance of the matched filter receiver approaches that of the soft-limiting receiver. It is noted that for some embodiments of the invention, the gain of the soft-limiting receiver over the conventional matched filter receiver for small values of SIR is large. Note that this gain requires the absence of any Gaussian receiver noise component, which may be considered unrealistic. This is considered in further detail below.

Figure 3:
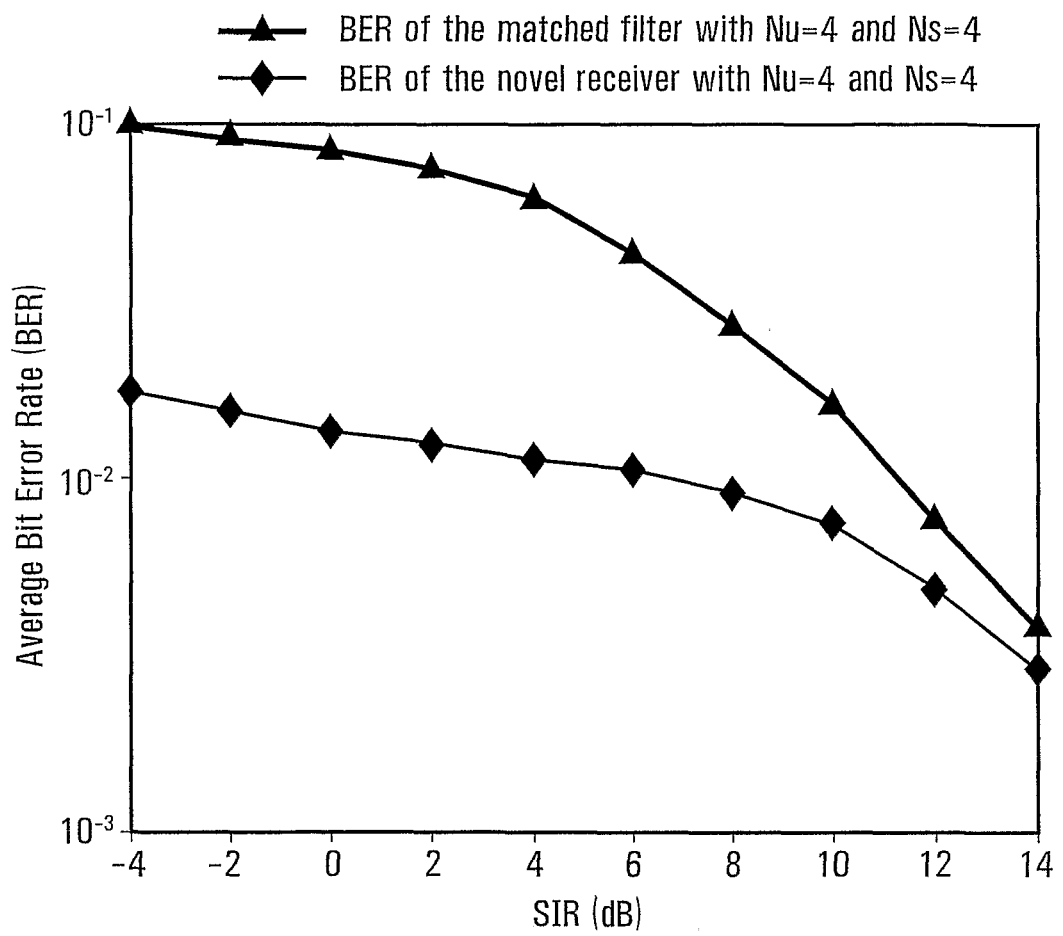
FIG. 3 is a graph containing plots of the average BER versus SIR of a soft-limiting UWB receiver according to an embodiment of the invention and a conventional TH-BPSK UWB receiver assuming 3 asynchronous interferers.

The choice of system parameters in FIG. 2 implies that multiuser interference will be frequent. It is of interest to assess the performances of the two types of receiver structures, soft-limiting versus matched filter, when interference is less frequent. FIG. 3 is a graph displaying similar information to the graph of FIG. 2, except that the number of interferers represented in the simulated curves has been reduced from 15 to 3, i.e. the number of users $N_u$ is changed from 16 to 4. Furthermore, the curves in FIG. 3 are generated only for $N_s=4$. In some embodiments, beneficial performance of the soft-limiting receiver is greater at small values of SIR, but is similar for practical values of BER around $10^{-2}$.

Figure 4:
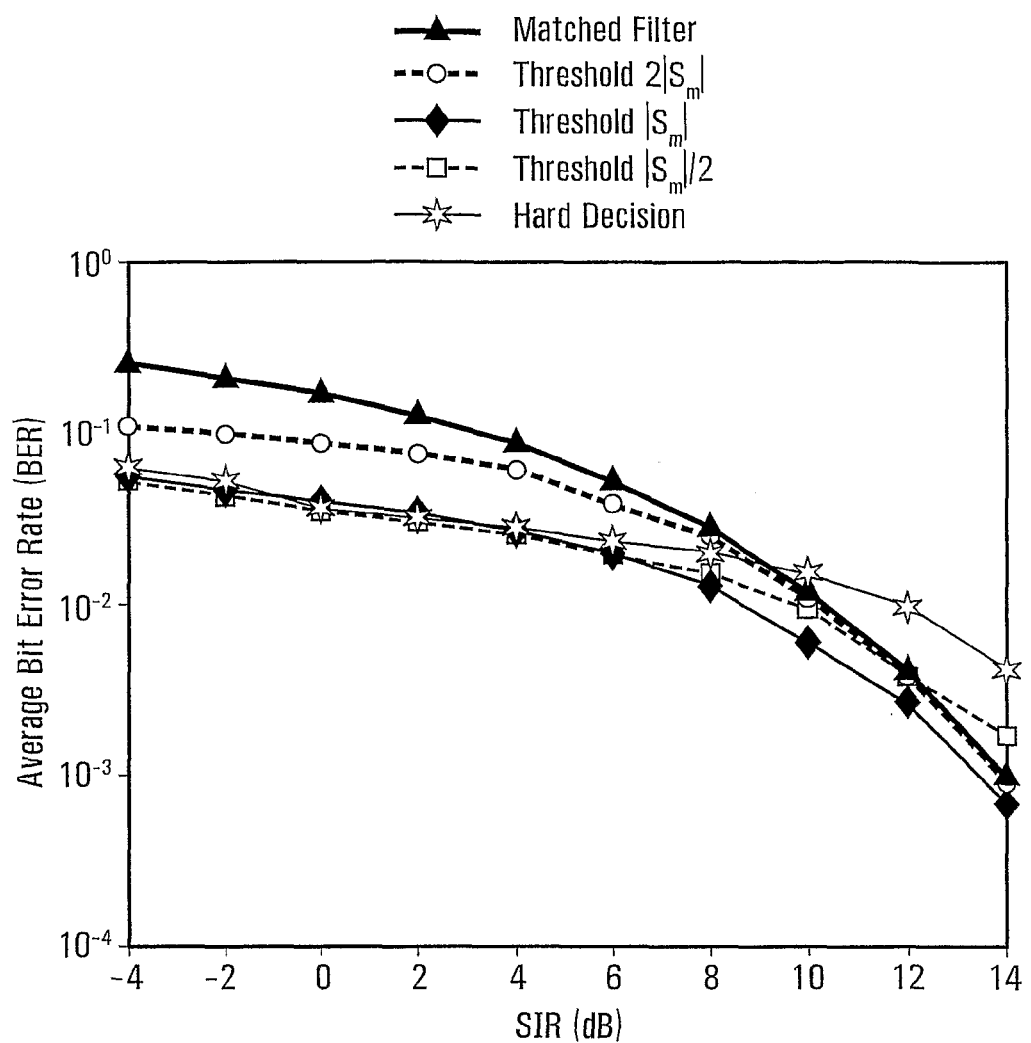
FIG. 4 is a graph containing plots of the average BER versus SIR of a soft-limiting UWB receiver according to an embodiment of the invention and a conventional TH-BPSK UWB receiver assuming 15 asynchronous interferers and with $N_s=8$.

In order to investigate the sensitivity of the BER performance of the soft-limiting receiver to estimation error in the threshold value $|S_m|$, simulation BER results are also provided for the receiver with different threshold values. FIG. 4 illustrates BER curves for different threshold values of the TH-BPSK system in the presence of MAI, which are plotted as a function of SIR for $N_s=8$ and $N_u=16$. The range of SIR on the horizontal axis is −4 dB to 14 dB and the range of BER on the vertical axis is $10^{-4}$ to $10^0$.

The resulting BER for a threshold value of $|S_m|$ is indicated in FIG. 4 by the curve with solid diamond markers. A first bounding curve represented by the matched filter case is indicated by the curve with solid triangle markers. A second boundary curve represented by a hard decision case is indicated by the curve with star shaped markers. Two other curves between the first and second boundary cases of the matched filter and hard decision curves are also considered for comparison. The two additional cases have threshold values of $2|S_m|$, indicated by the curve with circular markers, and $\frac{1}{2}|S_m|$, indicated by the curve with square markers. As the soft-limiting threshold value tends to infinity, i.e. greater than $2|S_m|$, the soft-limiting receiver structure is equivalent to the matched filter; when the threshold is 0, i.e. less than $\frac{1}{2}|S_m|$, the receiver structure becomes a hard-limiting or hard decision receiver.

In the example of FIG. 4, it is observed that when the SIR values are less than 6 dB, the soft-limiting receivers with thresholds $|S_m|$, $\frac{1}{2}|S_m|$ and 0 achieve similar bit error rates, all outperforming the matched filter and the receiver with threshold $2|S_m|$. However, as the SIR value increases, the performance of the hard decision receiver significantly deteriorates, and the receiver with threshold $|S_m|$ outperforms the receivers using other threshold values. In addition, it is seen that the receiver with threshold $2|S_m|$ outperforms the matched filter receiver for all values of SIR, although the performance difference diminishes to nothing as the SIR increases.

Figure 5:
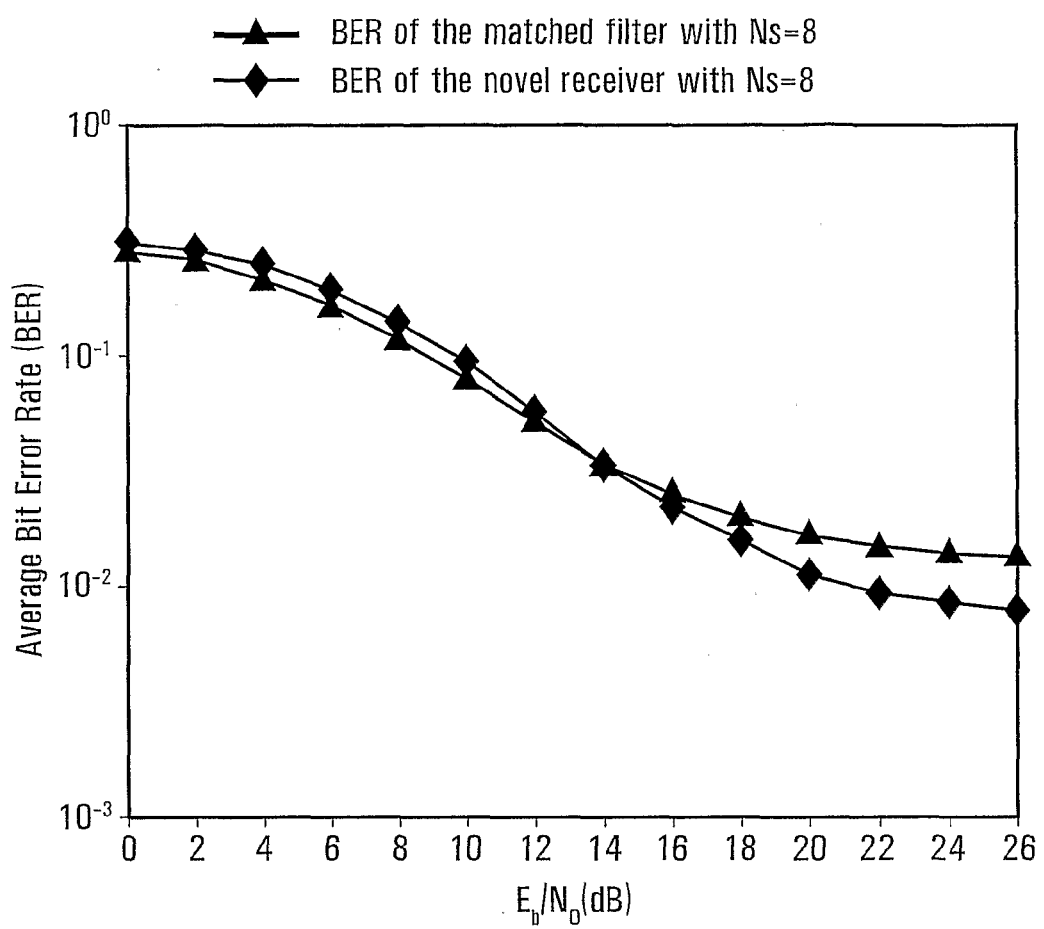
FIG. 5 is a graph containing plots of the average BER versus SNR of a soft-limiting UWB receiver according to an embodiment of the invention and a conventional TH-BPSK UWB receiver assuming 15 asynchronous interferers and with $N_s=8$.

While the soft-limiting receiver offers very large gains for small values of SIR, these gains may not be realized in a practical receiver because of thermal receiver noise. As an example, for the soft-limiting receiver operating in MAI and background noise, BER curves of the TH-BPSK system are presented as a function of SNR with 15 interfering users for a value of SIR=10 dB in FIG. 5. The SNR is defined as $E_b/N_0$. The range of SNR values in the graph of FIG. 5 is 0 dB to 26 dB along the vertical axis. The range of BER is $10^{-3}$ to $10^0$ along the horizontal axis. In FIG. 5, the curve with triangular markers represents the BER performance achieved by the matched filter, and the curve with diamond markers represents the BERs obtained using the soft-limiting receiver structure with threshold $|S_m|$. As seen in the example of FIG. 5, the matched filter correlation receiver achieves better performance than the new receiver for small SNR values, i.e. below 14 dB. However, the soft-limiting receiver structure outperforms the matched filter for medium and large SNR values, that is when the SNR is greater than 14 dB, lowering the error rate floor caused by the MAI. These observations can be explained as follows. For small values of SNR, the background Gaussian noise N is dominant in the term I+N, and therefore I+N can be approximated as a Gaussian distributed random variable. In this case, the conventional correlation receiver works almost as an optimal receiver, and thus, it outperforms the soft-limiting receiving structure. On the other hand, when the SNR is large, the interference I is dominant in the sum I+N and I+N cannot be approximated as a Gaussian random variable. Then, the matched filter correlation receiver is not optimal. The soft-limiting receiver, based on Eq. (12) for example, effectively suppresses (limits) part of the interference, and achieves better performance. Note that the region in FIG. 5 where the conventional matched filter UWB receiver outperforms the soft-limiting receiver is an impractical region of operation as the BER is too large to be acceptable for transmission.

Figure 6:
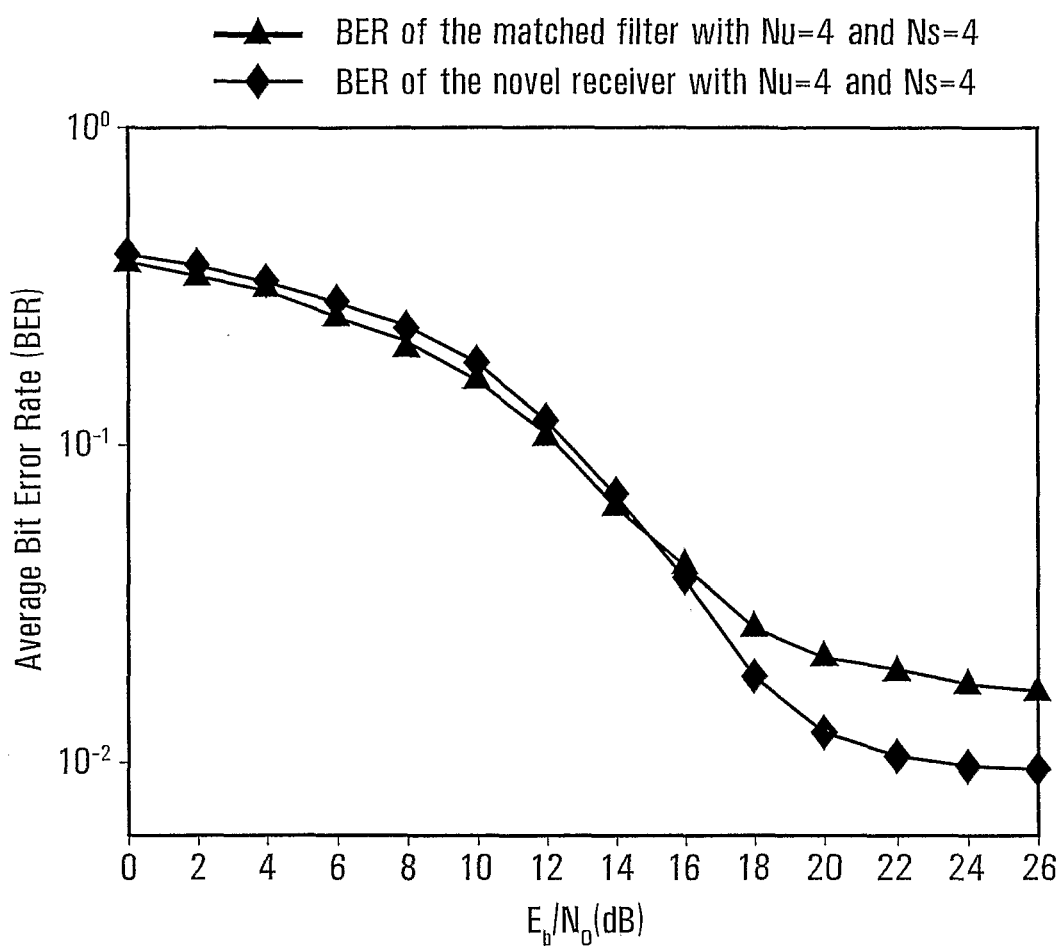
FIG. 6 is a graph containing plots of the average BER versus SNR of a soft-limiting UWB receiver according to an embodiment of the invention and a conventional TH-BPSK UWB receiver assuming 3 asynchronous interferers.

FIG. 6 is a graph displaying similar information to the graph of FIG. 5, except that the parameter of the number of users is reduced from 16 to 4, therefore there are 3 interferers rather than 15. Furthermore, the parameter $N_s$ is equal to $N_s=4$ for the simulated curves of FIG. 5. The example of FIG. 6 illustrates that benefits of the soft-limiting receiver are greater for a smaller number of interferers, i.e., the reduction in the error floor is greater. Also, the differences in performance between the conventional matched filter receiver and the soft-limiting receiver for small values of SNR, between 0 dB and 14 dB for the example of FIG. 6, are smaller.

Figure 7:
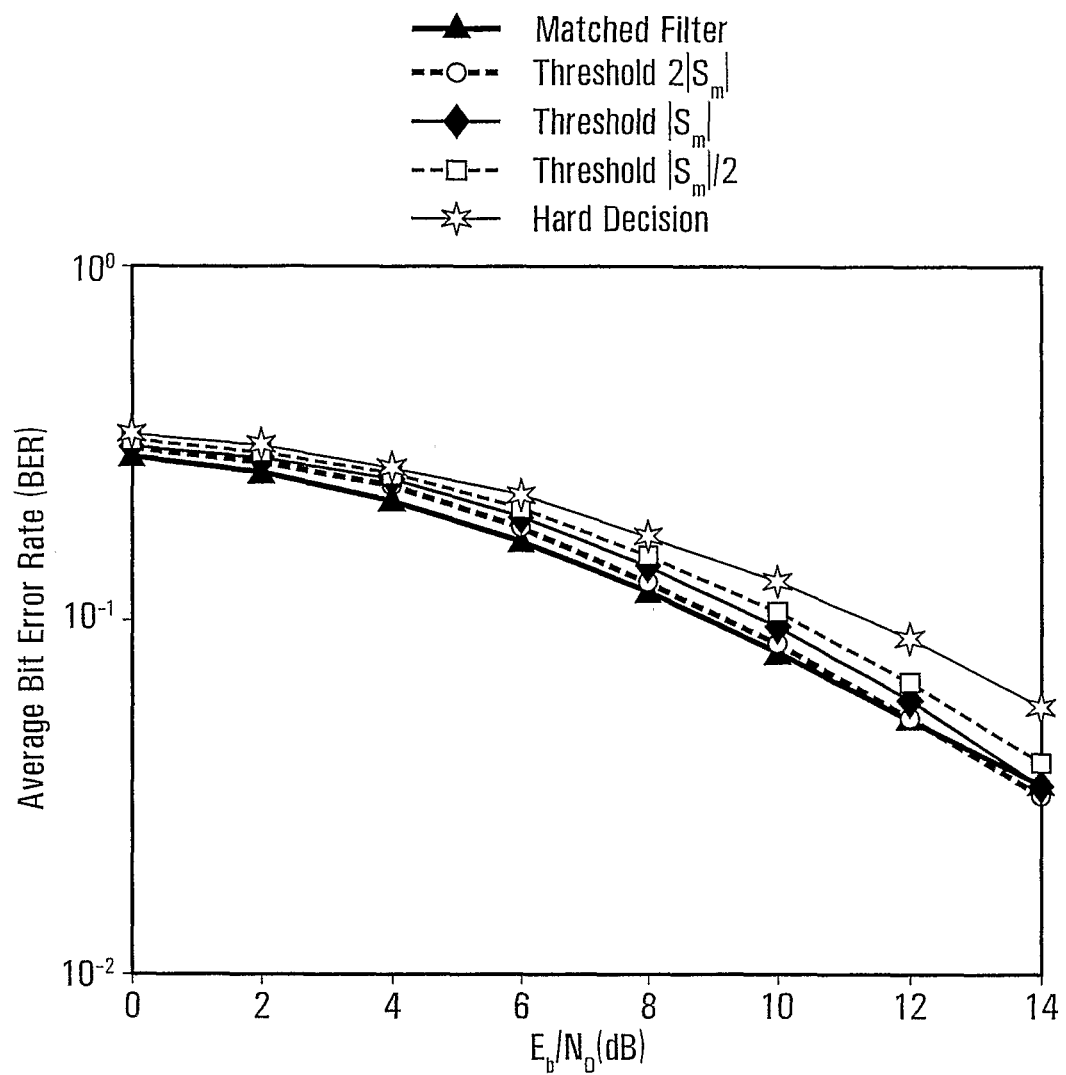
FIG. 7 is a graph containing plots of the average BER versus SNR of a soft-limiting UWB receiver according to an embodiment of the invention and a conventional TH-BPSK UWB receiver assuming 15 asynchronous interferers with $N_s=8$ for small values of SNR.
Figure 8:
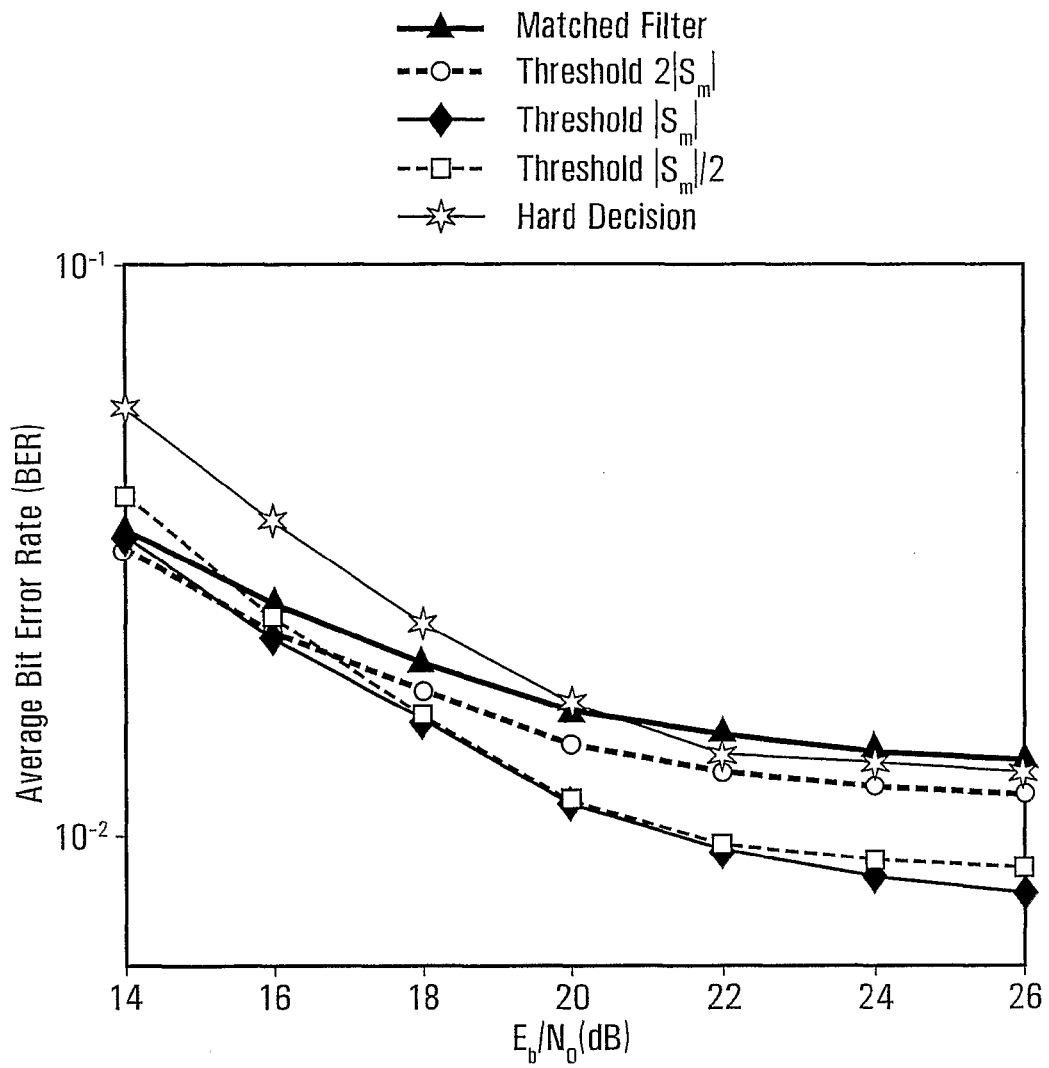
FIG. 8 is a graph containing plots of the average BER versus SNR of a soft-limiting UWB receiver according to an embodiment of the invention and a conventional TH-BPSK UWB receiver assuming 15 asynchronous interferers with $N_s=8$ for large values of SNR.

The effects of estimation error in the threshold on the BER performance are investigated in FIGS. 7 and 8. FIGS. 7 and 8 illustrate BER (vertical axis) versus SNR (horizontal axis), where SNR is represented by $E_B/N_0$. Similar threshold values to that of FIG. 4 are plotted in FIGS. 7 and 8. FIG. 7 includes simulated curves for three threshold values for the soft limiting receiver and two boundary curves representing the matched filter receiver and hard limiter receiver cases, all for a range of SNR from 0 dB to 14 dB. FIG. 8 includes the same curves for a range of SNR from 14 dB to 26 dB. FIGS. 7 and 8 both show that the receiver with threshold $\frac{1}{2}|S_m|$ achieves comparable performance to the receiver with perfect estimation of the threshold $|S_m|$, and the performance of the receiver with threshold $2|S_m|$ is close to the performance of the matched filter. These observations coincide with the results obtained for the interference-limited case shown in FIG. 4.

Soft-Limiting Receiver with Threshold Chosen According to Channel Conditions

Figure 1B:
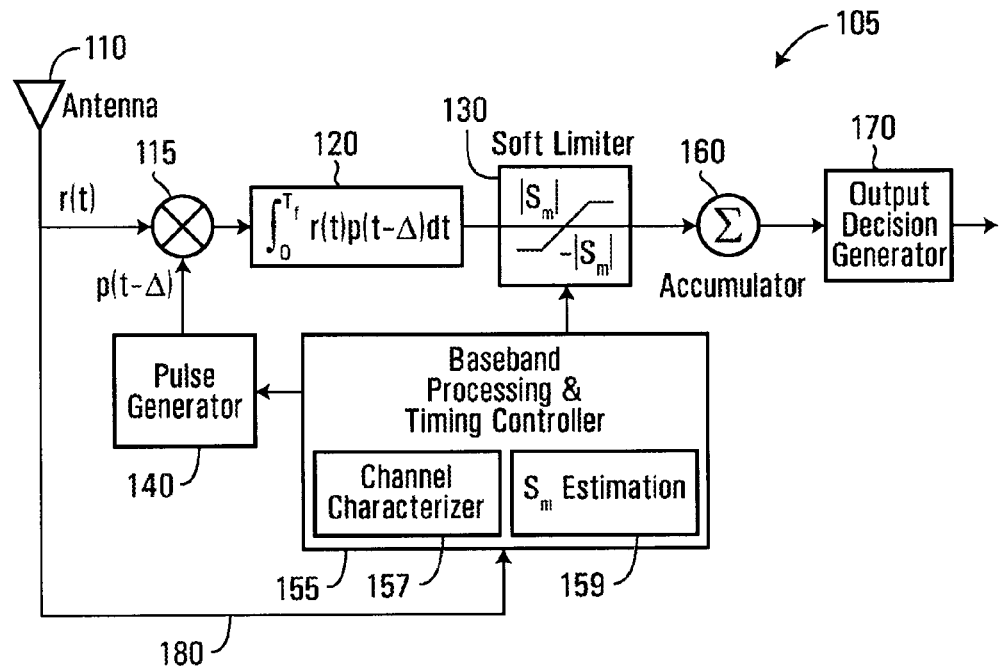

Another embodiment of the invention provides for a soft-limiting receiver that uses a threshold chosen according to channel conditions. An example of a block diagram for this type of receiver is shown in FIG. 1B. The block diagram of the receiver 105 is similar to the soft limiting receiver of FIG. 1A except that the soft-limiter 130 has a threshold that is chosen according to channel conditions. Thus, in FIG. 1B the received signal is also shown input to the baseband processing and timing controller 155, the input indicated by line 180, where the threshold is selected as a function of channel conditions. In some embodiments, baseband processing and timing controller 155 is similar to baseband processing and timing controller 150 of FIG. 12, but baseband processing and timing controller 155 is configured to accept a received signal and determine an appropriate threshold based on channel conditions. When the threshold is optimized, this receiver 105 will meet or surpass the performance of the conventional matched filter UWB receiver and that of the soft-limiting UWB receiver.

The illustrated example of FIG. 1B shows a channel characterizer 157 and a $S_m$ estimation block 159 within the baseband processing and timing controller 155. In operation, the channel characterizer 157 receives information about the received signal, for example via 180, and used this information to characterize the channel. The $S_m$ estimation block 159 may then receive an output from the channel characterizer 157, which is used to estimate $S_m$ based on the channel characteristic. In some embodiments the $S_m$ estimation block may not be part of the baseband processing and timing controller 150, but may be, for example, a separate function of the receiver which provides an output to the soft-limiter 130.

Generally, the receiver is responsible for determining the threshold value. In some embodiments, the threshold to use is maintained as a function of SNR and SIR as detailed below, but other implementations are possible. For example, the threshold information may be maintained in a table and looked up by the receiver after estimating the channel state.

In some cases, the threshold is set once at start up. In other embodiments, the threshold is selected according to channel conditions from time to time. This would be at a rate that is slow relative to the data rate. When the threshold is selected according to channel conditions from time to time, this may be considered an adaptive threshold.

Figure 9:
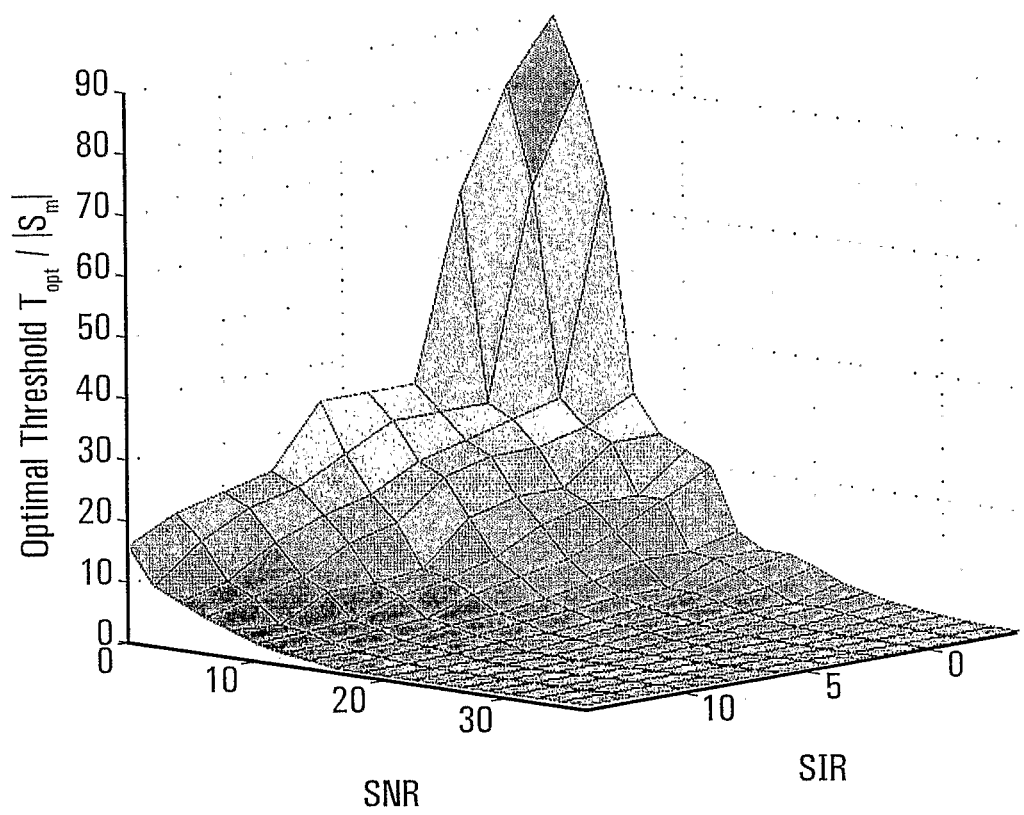
FIG. 9 is a graph containing plots of normalized optimal threshold values of a soft-limiting UWB receiver according to an embodiment of the invention for different values of SNR and SIR.

In some embodiments, when the threshold is selectable from time to time, the threshold is selected to minimize the BER using a computer search. FIG. 9 illustrates a 3-D plot of the ratio of optimal threshold $T_{opt}$ to $|S_m|$ plotted as a function of SNR and SIR. In FIG. 9, the optimal threshold values of the soft-limiting receiver are simulated for operating with three interfering users. SNR and SIR values are plotted on the horizontal axis and ratios of optimal threshold $T_{opt}$ to $|S_m|$ corresponding to these values are plotted on the vertical axis.

Figure 10:
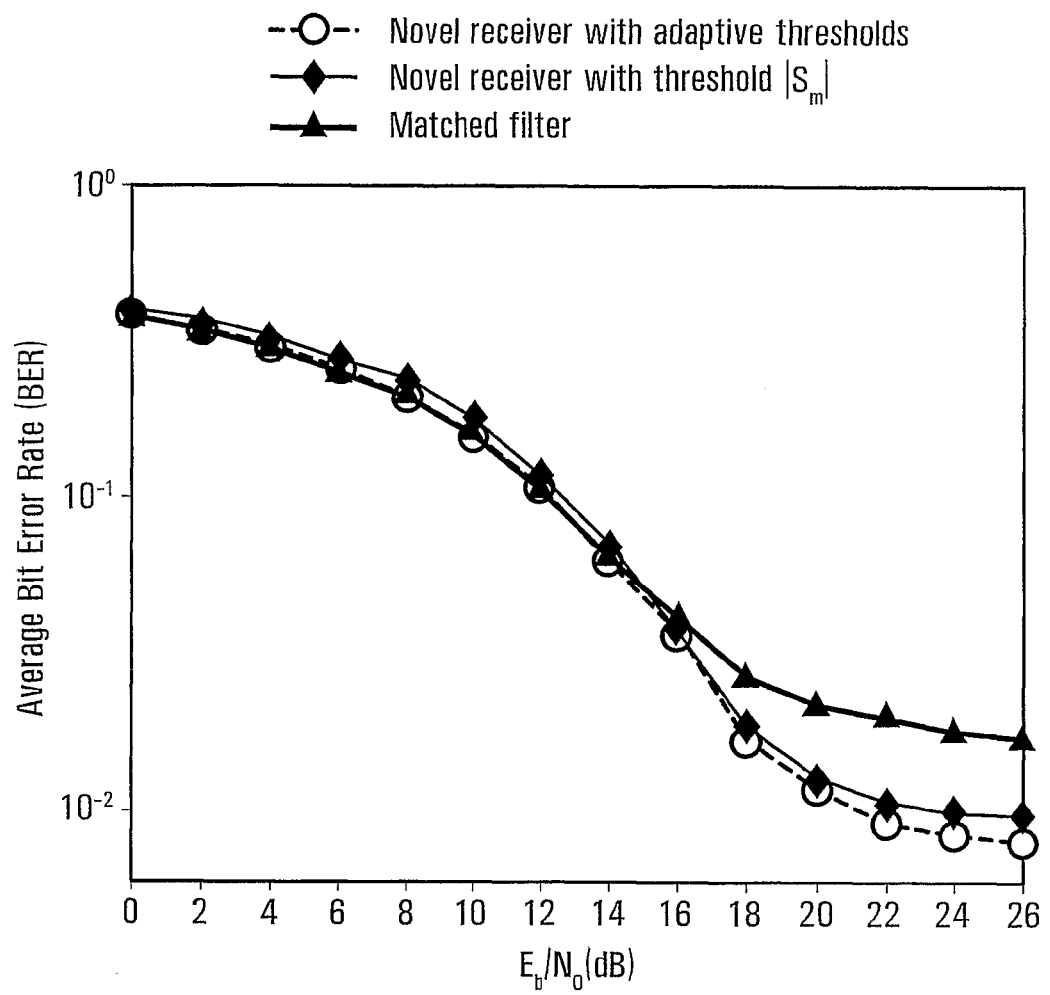
FIG. 10 is a graph containing plots of the average BER versus SNR of two soft-limiting UWB receivers according to an embodiment of the invention and a conventional TH-BPSK UWB receiver assuming 3 asynchronous interferers.

Based on optimal threshold values from the example of FIG. 9, BER results of an adaptive threshold soft-limiting receiver are provided in FIG. 10 for $N_u=4$ and $N_s=4$, as indicated by the curve with the circular markers. FIG. 10 also includes BER results simulated for the conventional matched filter receiver, as indicated by the curve with the solid triangular markers, and the soft-limiting receiver with fixed threshold $|S_m|$, as indicated by the curve with the solid diamond markers. The particular example of the soft-limiting receiver with adaptive threshold, represented by the curve with the circular markers, achieves essentially the same performance as the matched filter receiver for small SNR values, i.e. between 0 dB and 14 dB in the example of FIG. 10, outperforming the soft-limiting receiver using threshold $|S_m|$. For large values of SNR, i.e. between 14 dB and 26 dB in the example of FIG. 10, the performance of the adaptive threshold soft-limiting receiver surpasses those of the matched filter and the soft-limiting receiver with a fixed threshold.

Figure 11:
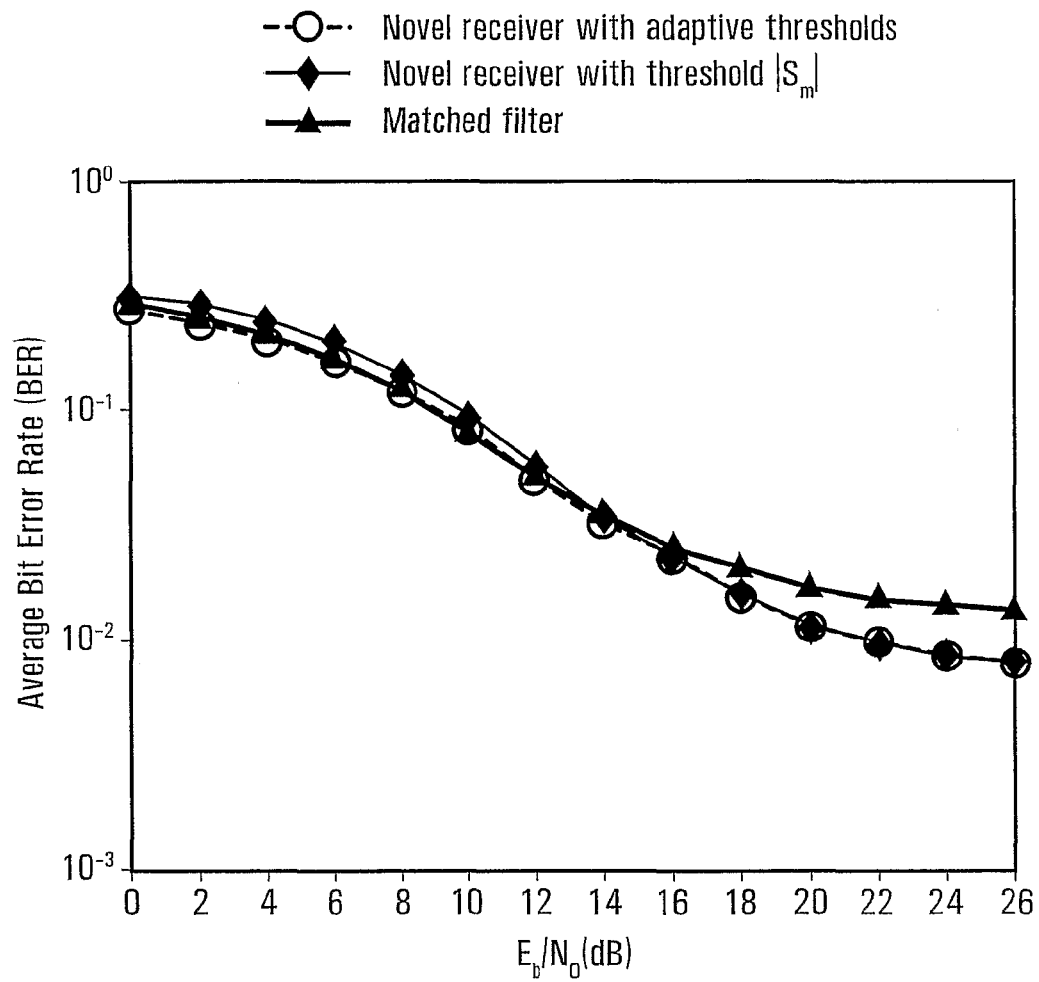
FIG. 11 is a graph containing plots of the average BER versus SNR of two soft-limiting UWB receivers according to an embodiment of the invention and a conventional TH-BPSK UWB receiver assuming 15 asynchronous interferers.

As an example for the TH-UWB system operating with more interfering users, FIG. 11 shows the BER versus SNR simulations of the TH-BPSK system with $N_u=16$ and $N_s=8$. Similar to FIG. 10, the matched filter receiver and the soft-limiting receiver with adaptive threshold achieve indistinguishable error rates for small and medium values of SNR, i.e. 0 db to 14 dB in FIG. 11, both outperforming the soft-limiting receiver with fixed threshold $|S_m|$. On the other hand, as the value of SNR increases, i.e. 14 db to 26 dB in FIG. 11, almost the same BER performance can be achieved by using the soft-limiting receivers with fixed threshold and with adaptive threshold, surpassing the performance of the conventional matched filter. It is seen from FIGS. 10 and 11 that the novel adaptive soft-limiting receiver structure meets or surpasses the performances of the conventional matched filter receiver and the soft-limiting receiver with threshold $|S_m|$.

Figure 12:
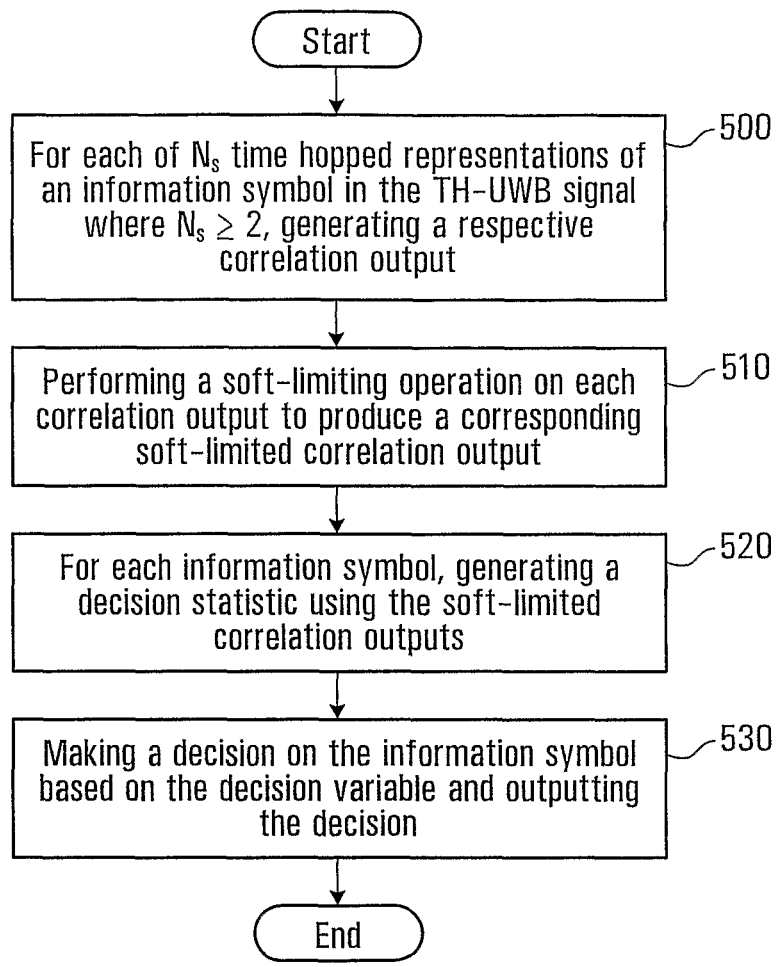
FIG. 12 is a flow chart for a method of processing a received TH-UWB signal according to an embodiment of the invention.

A method for processing a received time-hopping ultra-wide band (TH-UWB) signal will now be described with regard to the flow chart of FIG. 12. A first step 500 involves for each of $N_s$ time hopped representations of an information symbol in the TH-UWB signal where $N_s \geq 2$, generating a respective correlation output. A second step 510 involves performing a soft-limiting operation on each correlation output to produce a corresponding soft-limited correlation output. A third step 520 involves for each information symbol, generating a decision statistic using the soft-limited correlation outputs. A fourth step 530 involves making a decision on the information symbol based on the decision variable and outputting the decision.

Figure 13:
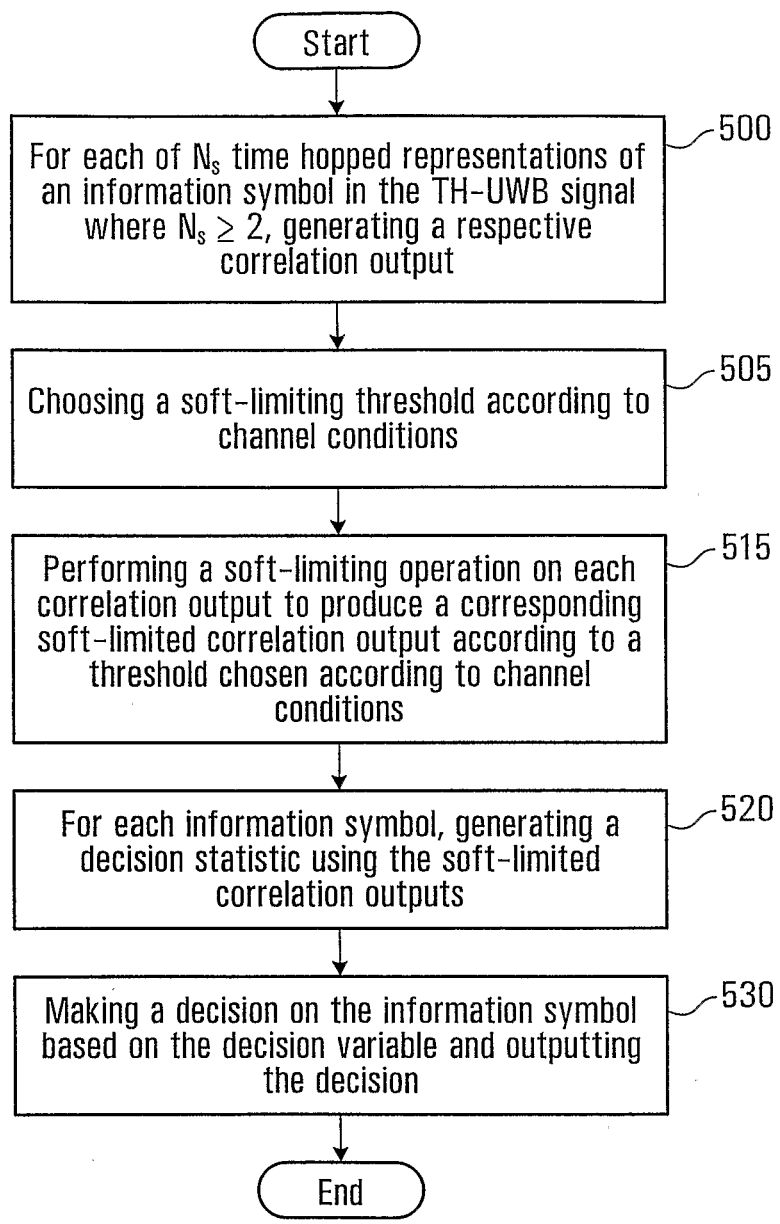
FIG. 13 is a flow chart for a method of processing a received TH-UWB signal according to another embodiment of the invention.

Another example of a method for processing a received time-hopping ultra-wide band (TH-UWB) signal will now be described with regard to the flow chart of FIG. 13. FIG. 13 includes the same steps 500, 520, and 530 as included in FIG. 12, but includes the further step 505 of choosing a soft-limiting threshold according to channel conditions. Therefore, the step of the soft-limiting operation on each correlation output used to produce a corresponding soft-limited correlation output, which corresponds to step 510 in FIG. 12, is replaced in FIG. 13 with step 515, which involves performing the soft-limiting operation with the threshold chosen according to channel conditions.

In some embodiments of the method, the soft-limiting threshold is chosen once at start up, and in other embodiments the threshold is chosen according to channel conditions from time to time. Choosing the soft-limiting threshold according to channel conditions may include one or more of, for example, maintaining a threshold value for each of a plurality of channel conditions; determining a channel condition; and selecting the threshold for the determined channel condition. In some embodiments, maintaining a threshold value for each of a plurality of channel conditions may include maintaining a threshold value for each of a plurality of SNR+SIR operating conditions.

In some embodiments, performing a soft-limiting operation on each correlation output to produce a corresponding soft-limited correlation output comprises determining:

$$\tilde{r}_m = \begin{cases} |S_m|, & \text{if } |S_m| \leq r_m \\ r_m, & \text{if } -|S_m| < r_m < |S_m| \\ -|S_m|, & \text{if } r_m \leq -|S_m|. \end{cases}$$

where $r_m$ is the correlation output for the mth representation and $S_m$ is the desired signal component for the mth representation, where $m=1, \ldots, N_s$.

In some embodiments, the methods also include making an estimate of $S_m$ for each chip. In some embodiments, the estimate is assumed to be constant for a duration of a transmission.

In some embodiments the various components of a soft-limiting receiver, for example components such as multiplier 115, correlator 120, soft-limiter 130, baseband processing and timing controller 150,155, accumulator 160 and output decision generator 170 in FIGS. 1A and 1B, can be physically implemented using software, hardware or a combination of the two. For example, a hardware implementation may include using application specific integrated circuits (ASIC) or field programmable gate arrays (FPGA). To implement the functional components in software, in some embodiments a microprocessor capable of performing basic digital signal processing operations is utilized.

The soft-limiting receiver structure described above with regard to FIGS. 1A and 1B is implemented by a device receiving a signal. In some embodiments, the device is a mobile station. Examples of a mobile station may include a cell phone, a computer with a wireless modem, a wireless communication enabled personal data assistant (PDA). A mobile station may be either nomadic or have fixed position. In some embodiments, the device is a base station used to communicate with mobile stations. In some embodiments, the device is used to replace wires or cables.

In addition to the particular components described above as components in the receiver that are related to the invention, the receiver may have other components related to the operation of other activities that may be performed by the receiver. For example, the receiver may include transmit circuitry and hardware and/or software for, to name a few functions, accessing networks, monitoring connections, performing handoffs, etc.

Numerous modifications and variations of the present invention are possible in light of the above teachings. It is therefore to be understood that within the scope of the appended claims, the invention may be practiced otherwise than as specifically described herein.

The invention claimed is:

1. A method of processing a received time-hopping ultra-wide band (TH-UWB) signal comprising:
   for each of $N_s$ time hopped representations of an information symbol in the TH-UWB signal where $N_s \geq 2$, generating a respective correlation output;
   performing a soft-limiting operation on each correlation output to produce a corresponding soft-limited correlation output;
   for each information symbol, generating a decision statistic using the soft-limited correlation outputs;
   making a decision on the information symbol based on the decision statistic and outputting the decision;
   wherein performing a soft-limiting operation on each correlation output to produce a corresponding soft-limited correlation output comprises determining:

$$\tilde{r}_m = \begin{cases} |S_m|, & \text{if } |S_m| \leq r_m \\ r_m, & \text{if } -|S_m| < r_m < |S_m| \\ -|S_m|, & \text{if } r_m \leq -|S_m| \end{cases}$$

where $r_m$ is the correlation output for the mth representation and $S_m$ is the desired signal component for the mth representation, where $m=1, \ldots, N_s$.

2. The method of claim 1 further comprising receiving the TH-UWB signal on at least one antenna.

3. The method of claim 1 further comprising:
   making an estimate of $S_m$ for each chip.

4. The method of claim 1 further comprising:
   making an estimate of $S_m$ that is assumed to be constant for a duration of a transmission.

5. The method of claim 1 wherein for each information symbol, generating a decision statistic using the soft-limited correlation outputs comprises determining a decision statistic $\tilde{r}$ according to:

$$\tilde{r} = \sum_{m=0}^{N_s-1} \tilde{r}_m.$$

6. The method of claim 5 wherein making a decision on the information symbol based on the decision statistic and outputting the decision comprises determining a transmitted information bit $d_0^{(1)}$ according to:

$\tilde{r} > 0 \Rightarrow d_0^{(1)} = 1$ $\tilde{r} \leq 0 \Rightarrow d_0^{(1)} = -1$.

7. The method of claim 1 further comprising:
   choosing a soft-limiting threshold according to channel conditions;
   wherein performing a soft-limiting operation on each correlation output to produce a corresponding soft-limited correlation output comprises performing the soft-limiting operation with the threshold chosen according to channel conditions.

8. The method of claim 7 wherein the threshold is chosen once at start up.

9. The method of claim 7 wherein further comprising choosing the threshold according to channel conditions from time to time.

10. The method of claim 7, wherein choosing a soft-limiting threshold according to channel conditions comprises choosing the soft-limiting threshold according to one or more of signal-to-interference ratio (SIR) and signal-to-noise ratio (SNR).

11. The method of claim 7, wherein choosing the soft-limiting threshold according to channel conditions comprises:
   maintaining a threshold value for each of a plurality of channel conditions;
   determining a channel condition;
   selecting the threshold for the determined channel condition.

12. The method of claim 11 wherein maintaining a threshold value for each of a plurality of channel conditions comprises maintaining a threshold value for each of a plurality of SNR and/or SIR operating conditions.

13. A receiver adapted to implement the method of claim 1.

14. A receiver comprising:
   at least one antenna for receiving a received TH-UWB signal;
   a correlator for generating a correlation output for each of $N_s$ time hopped representations of an information symbol in the TH-UWB signal where $N_s \geq 2$;
   a soft-limiter that performs a soft-limiting operation on each correlation output to produce a corresponding soft-limited correlation output;
   an accumulator that combines the soft-limited correlation outputs for each information symbol and generates a decision statistic;
   an output decision generator that makes a decision on the information symbol based on the decision statistic and outputs the decision;
   baseband processing and timing controller that sets a threshold of the soft-limiter.

15. The receiver of claim 14 wherein the baseband processing and timing controller sets the threshold of the soft-limiter as a function of channel conditions.

16. A non-transitory computer readable medium having stored thereon program instructions executable by a processor for processing a received time-hopping ultra-wide band (TH-UWB) signal comprising:
   program instructions for each of $N_s$ time hopped representations of an information symbol in the TH-UWB signal where $N_s \geq 2$, generating a respective correlation output;
   program instructions for performing a soft-limiting operation on each correlation output to produce a corresponding soft-limited correlation output;
   program instructions for each information symbol, generating a decision statistic using the soft-limited correlation outputs;
   program instructions for making a decision on the information symbol based on the decision statistic and outputting the decision;
   program instructions for choosing a soft-limiting threshold according to channel conditions;
   wherein performing a soft-limiting operation on each correlation output to produce a corresponding soft-limited correlation output comprises performing the soft-limiting operation with the threshold chosen according to channel conditions.

* * * * *

UNITED STATES PATENT AND TRADEMARK OFFICE
CERTIFICATE OF CORRECTION

PATENT NO. : 8,442,093 B2
APPLICATION NO. : 12/438262
DATED : May 14, 2013
INVENTOR(S) : Beaulieu It is certified that error appears in the above-identified patent and that said Letters Patent is hereby corrected as shown below:

In the Specification

Column 1, line 60, EQ (1): the "=" is missing between (t) and $\sqrt{\frac{E_b}{N_s}}$. The equation should read as follows:

$$s^{(k)}(t) = \sqrt{\frac{E_b}{N_s}} \sum_{j=-\infty}^{\infty} d^{(k)}_{\lfloor j/N_s \rfloor} p(t - jT_f - c_j^{(k)} T_c)$$

In the Claim

Column 13, claim 1, line 11: ..."for each of $N_s$, time..." should read -- for each of $N_s$ time --

Column 13, claim 1, a "." is missing at the end of the equation. The equation should read as follows:

$$\tilde{r}_m = \begin{cases} |S_m|, & if\ |S_m| \leq r_m \\ r_m, & if\ -|S_m| < r_m < |S_m| \\ -|S_m|, & if\ r_m \leq -|S_m|. \end{cases}$$

Signed and Sealed this
Eleventh Day of February, 2014

Michelle K. Lee
*Deputy Director of the United States Patent and Trademark Office*